(12) United States Patent
Vaupel et al.

(10) Patent No.: US 11,722,201 B2
(45) Date of Patent: Aug. 8, 2023

(54) METHODS AND APPARATUSES FOR FINGERPRINTING EMPLOYING FUNCTION-BASED MATCHING PATTERNS

(71) Applicant: Fraunhofer-Gesellschaft zur Förderung der angewandten Forschung e.V., Munich (DE)

(72) Inventors: Thorsten Vaupel, Erlangen (DE); Steffen Meyer, Erlangen (DE); Mohammad Alawieh, Erlangen (DE); Bastian Perner, Erlangen (DE); Jürgen Hupp, Erlangen (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

(21) Appl. No.: 17/912,652

(22) PCT Filed: Mar. 2, 2021

(86) PCT No.: PCT/EP2021/055104
§ 371 (c)(1),
(2) Date: Sep. 19, 2022

(87) PCT Pub. No.: WO2021/197739
PCT Pub. Date: Oct. 7, 2021

(65) Prior Publication Data
US 2023/0132921 A1    May 4, 2023

(30) Foreign Application Priority Data
Apr. 2, 2020   (EP) ..................................... 20167715

(51) Int. Cl.
*H04L 5/12* (2006.01)
*H04B 7/06* (2006.01)
*H04W 24/10* (2009.01)

(52) U.S. Cl.
CPC ......... *H04B 7/0695* (2013.01); *H04B 7/0639* (2013.01); *H04W 24/10* (2013.01)

(58) Field of Classification Search
CPC .... H04B 7/0695; H04B 7/0639; H04W 24/10
(Continued)

(56) References Cited

U.S. PATENT DOCUMENTS

2019/0037529 A1* 1/2019 Edge ...................... H04L 5/005

FOREIGN PATENT DOCUMENTS

WO    WO 2020/042081 A1    3/2020

OTHER PUBLICATIONS

International Preliminary Report on Patentability, European Patent Office, International Preliminary Examining Authority, dated May 23, 2022, International Application No. PCT/EP2021/055104.

* cited by examiner

*Primary Examiner* — Zewdu A Kassa
(74) *Attorney, Agent, or Firm* — Burr & Forman LLP; Jeffrey H. Kamenetsky

(57) ABSTRACT

The embodiments herein relate to method performed by a measurement device, the method comprising: receiving via higher layer signalling, information on resources or resource sets of one or more radio transmission devices transmitting one or more beam signals associated with said resources or resource sets; performing channel measurements of the one or more beam signals, per spatial filter or receiver beam of the measurement device; storing, over at least one time frame, the channel measurements into measurement groups, where each measurement group corresponds to the channel measurements performed using the same spatial filter of the measurement device; and reporting the measurement groups to a network node or correlating the measurements of each measurement group with reference data for each available
(Continued)

time frame individually and reporting the result of the correlation to the network node. The embodiments also relate to a method performed by a network node.

16 Claims, 13 Drawing Sheets

(58) Field of Classification Search
USPC .............. 375/262, 261, 259, 295, 219, 316
See application file for complete search history.

Figure 1
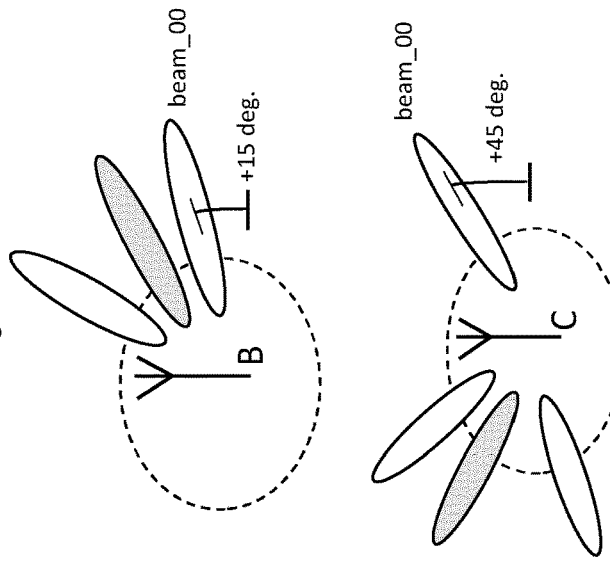
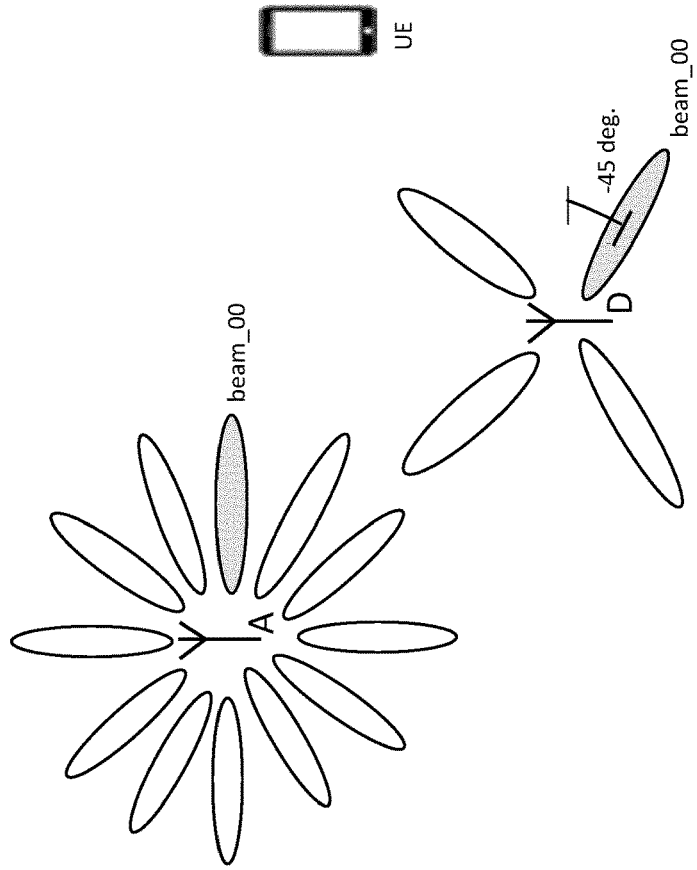

Pos = UE$_{ref}$

| ID | RSS @ t$_0$ | | |
|---|---|---|---|
| A | -60 dBm | @ beam_00 | @ 12_beam_pattern. ori=0° |
| B | n.a. | @ beam_01 | @ 12_beam_pattern. ori=+15° |
| C | -35 dBm | @ beam_05 | @ 12_beam_pattern. ori=+45° |
| D | -78 dBm | @ beam_00 | @ 4_beam_pattern. ori=-45° |

| ID | RSS @ t$_1$ | | |
|---|---|---|---|
| ... | | | |

| ID | RSS @ t$_2$ | | |
|---|---|---|---|
| A | -72 dBm | @ beam_02 | @ 12_beam_pattern. ori=0° |
| B | -76 dBm | @ beam_03 | @ 12_beam_pattern. ori=+15° |
| C | -58 dBm | @ beam_07 | @ 12_beam_pattern. ori=+45° |
| D | -23 dBm | @ beam_02 | @ 4_beam_pattern. ori=-45° |

| ID | RSS @ t$_n$ | | |
|---|---|---|---|
| ... | | | |

Figure 3

METHODS AND APPARATUSES FOR FINGERPRINTING EMPLOYING FUNCTION-BASED MATCHING PATTERNS

CROSS-REFERENCE TO RELATED APPLICATION

This application is a national stage application, filed under 35 U.S.C. § 371, of International Patent Application No. PCT/EP2021/055104 filed on Mar. 2, 2021, and European Patent Application EP20167715.0 filed on Apr. 2, 2020, which are incorporated by reference herein in their entirety.

TECHNICAL FIELD

The present disclosure relates to the field of wireless communications, and in particular to methods and apparatuses for enhancing classic fingerprinting approaches in a wireless communications system.

BACKGROUND

Fingerprinting is a pattern recognition technique where current measurements are compared with reference measurements at known locations. Various types of measurements and signals may be used (e. g. Round Trip Time—RTT, Angle of Arrival—AoA, Magnetic Fields etc.). The most common measurement that is used in the Received Signal Strength (RSS).

A database of reference measurements includes discreet reference points. Each of the reference point holds the measurement values and the location where the measurements were recorded/captured.

The initial phase in fingerprinting-based systems contains the calibration of an area. This may be done manually or by computation. In general, the outcome is a database of so called fingerprints or reference points as mentioned above. They represent the situation at a certain location. Therefore, the location (e.g. coordinates or an identifier) is stored for every single data set (=reference point) individually.

Common fingerprinting systems additionally store a list of surrounding station identification information (or IDs) and their corresponding received signal strength(s) at the calibration device location (at the location mentioned before). Below is shown a common (classic) fingerprint.

| Pos = UE | |
|---|---|
| ID | RSS |
| A | not detected |
| B | −60 dBm |
| C | −65 dBm |
| D | −78 dBm |

As shown, the fingerprint includes an ID of each radio base station (four base stations in this example), here denoted A, B, C and D. The fingerprint is shown including the Received Signal Strength (RSS) from each of radio base station. This information may be used to determine the position of the UE.

In well-known fingerprinting-based positioning systems the characteristic pattern for certain locations will are stored in a database (in a calibration phase).

The actual measurements are then compared with the database entries. This comparison is called matching and the aim is to find as similar as possible database entries to the measurements. The estimation of the position or location of the UE is made from the weighted geometric addition of locations from the best matching database entries. The measured and stored pattern is typically a vector of the unique IDs (e. g. Medium Access Control (MAC) addresses) of detectable stations.

The classic system based on single received signal strength (or snapshot) per base station has the following disadvantage: a snapshot whether in the calibration phase or in the actual measurement phase may be interfered significantly by temporary effects. Examples for interference are especially moving objects or persons and temporary modifications of the scenery (e.g. doors or gates) which Influence the received signal strengths to one or more transmitters.

There is therefore a need to enhance the classic fingerprinting approach and improve the way the determination of a position of a UE is performed.

SUMMARY

According to exemplary embodiments herein, there is provided methods and apparatuses for enhancing classic fingerprinting approaches and improving the way of determining the position of a user equipment.

According to an aspect of embodiments herein, there is provided a method performed by a measurement device. The method comprising: receiving, via higher layer signalling, information on resources or resource sets of one or more transmission devices transmitting one or more beam signals associated with said resources or resource sets; performing channel measurements of the one or more beam signals, per spatial filter or receiver beam of the measurement device; storing, over at least one time time, the channel measurements into measurement groups, where each measurement group corresponds to the channel measurements performed using the same spatial filter or receiver beam of the measurement device; reporting the measurement groups to a network node or correlating the measurements of each measurement group with reference data for each available time frame individually and reporting the result of the correlation to the network node.

According to another aspect of embodiments herein, there is provided a method performed by a network node (e.g. a location server), the method comprising: requesting one or more base stations or transmission devices to provide information on one or more beam signals and/or information on resources or resource sets associated with said one or more beam signals transmitted by said one or more base stations; receiving the requested information; transmitting the received information to a measurement device; receiving from the measurement device, measurement groups wherein each measurement group includes measurements performed by the measurement device using the same spatial filter or receiver beam; and using the received measurement groups and the information received from said one or more base stations for determining the location of the measurement device.

According to another aspect of embodiments herein there is provided a measurement device comprising a processor and memory, said memory containing instructions executable by said processor whereby the measurement device is configured to perform the subject matter disclosed herein.

According to another aspect of embodiments herein there is provided a location server comprising a processor and memory, said memory containing instructions executable by said processor whereby the location server is configured to perform the subject matter disclosed herein.

There is also provided a computer program comprising instructions which when executed on at least one processor of the measurement device to cause the least said one processor to carry out the method according to the subject matter herein.

There is also provided a computer program comprising instructions which when executed on at least one processor of the location server cause the least said one processor to carry out the method according to the subject matter disclosed herein.

Several advantages are achieved by the embodiments herein. An advantage is to enhance classis fingerprinting approaches. Another advantage is to improve the way the location of a device is determined. Yet another advantage is to have a more robust positioning approach.

BRIEF DESCRIPTION OF THE DRAWINGS

Examples of embodiments and additional advantages of the embodiments herein are described in more detail with reference to attached drawings in which:

FIG. 1 depicts an example of fingerprinting data for a certain location in time frame 0.

FIG. 3 depicts an example of a pattern reference data combining all time frames.

DETAILED DESCRIPTION

Figure 2:
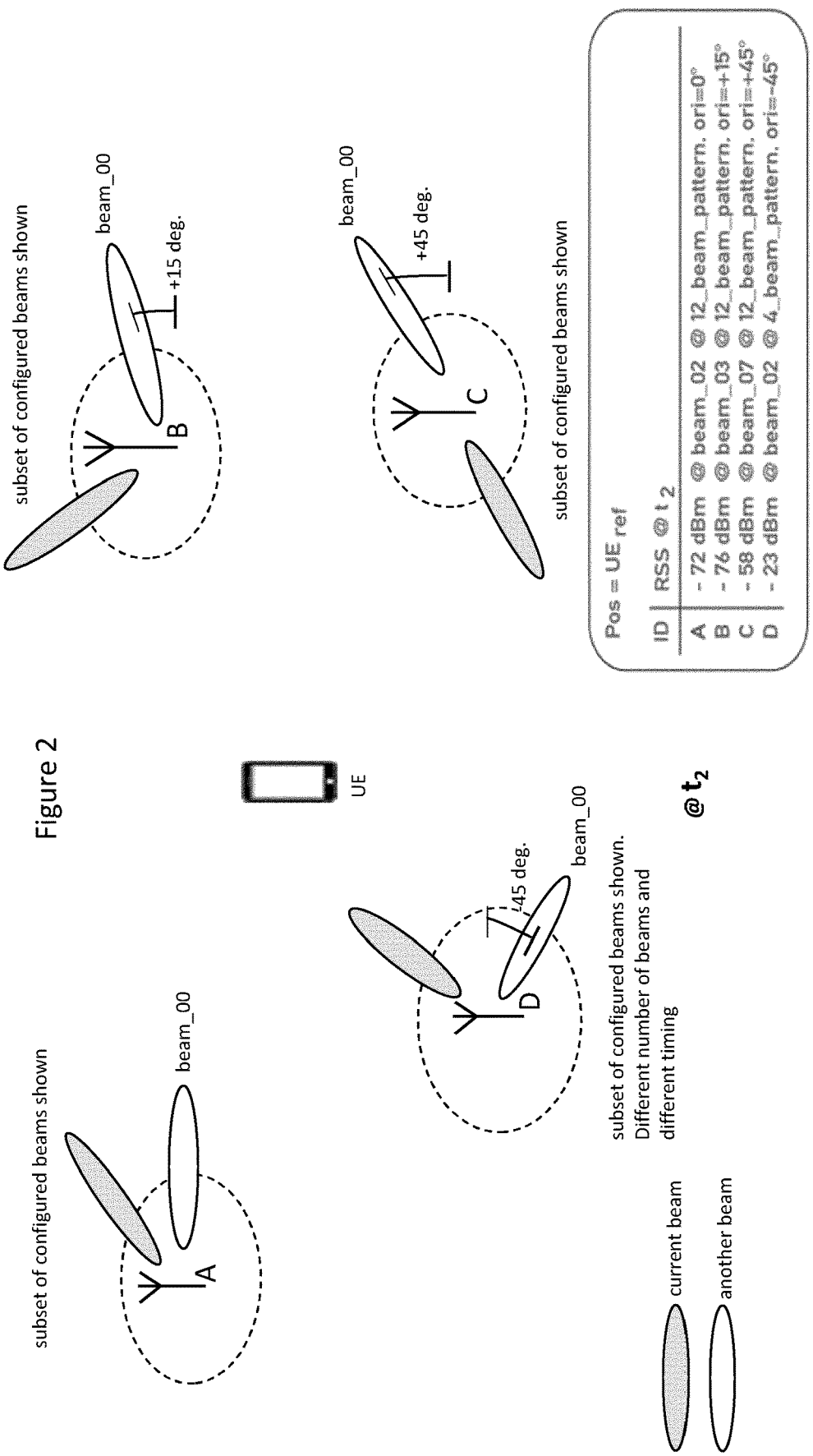
FIG. 2 depicts an example of fingerprinting data for a certain location in time frame 2.

In the following, is presented a detailed description of the exemplary embodiments in conjunction with the drawings, in several scenarios, to enable easier understanding of the solution(s) described herein.

The present disclosure describes solutions using the characteristics of sectored and beam formed antennas as patterns for fingerprinting methods in positioning. There is also an abstraction of this information in form of a function, representing the characteristics of parameters over time.

The term 'beam' is used in the following to denote a spatially selective/directive transmission of an outgoing signal or reception of an incoming signal which is achieved by precoding/filtering the signal at the antenna ports of a device with a particular set of coefficients. The words precoding or filtering may refer to processing of the signal in the analog or digital domain. The set of coefficients used to spatially direct a transmission/reception in a certain direction may differ from one direction to another direction. The term 'transmitter beam' or transmitter beam signal, denotes a spatially selective/directive transmission and the term 'receiver beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

In well-known fingerprinting-based positioning systems the characteristic pattern for certain locations are stored in a database (calibration phase). Later, actual measurements are compared with those database entries. This comparison is called matching and the goal is to find as similar as possible database entries to the measurement. The position guess is made from the weighted geometric addition of locations from the best matching database entries.

The measured and stored pattern is typically the vector of the unique ids (e. g. MAC addresses) of detectable radio base stations (or gNBs). A common enhancement used is to store their corresponding received signal strengths. The concept may include enhancing the basic approach by not only having this vector of values but also using a vector of functions.

A function may be a static or a dynamic transmission power level of reference signals over time. It results in characteristic changes at the receiver depending on the actual detection time. The power ramping function may be both in the measurement data acquisition phase and in position calculation phase.

Another function may be the antenna's direction, resulting in characteristic changes at the receiver (measurement device) on the detection along its location. This is the case because of attenuations and reflections caused by obstacles. This beam stroking function may be used both in the measurement data acquisition phase and in a position calculation phase.

There is no distinction between physically sectorized antenna sequentially activated and electronically formed beams temporarily emitting in an area.

The possibility of using combined patterns like transmission power characteristics together with the selected beam and its shape may be made available.

A function implemented by a detection device, in this case may be
- known (by e.g. configuration)
- exchanged (e. g. via signaling or high-level communication),
- selected by estimating/guessing (like synchronizing on a common sequence) or
- guessed/estimated completely (like observing or learning the function/pattern, even if it is dynamically changing).

According to some embodiments herein, for the function-based matching approach, a whole pattern is stored for each surrounding radio base station (or gNB). The stored pattern represents the progression of measured characteristics (typically received signal strength) over a certain time. The time frame can be limited representing a periodically executed function.

The representation comprises information needed to adjust correctly the expectation in the matching phase. It may range from an actual value for each time frame within the pattern to the minimal way of storing only a label and having the pattern with reduced data. Below is a general function-based fingerprint wherein for each radio base station (e.g. A or B or C or D) there is a corresponding function. In this example, a function of RSS.

| Pos = UE | |
|---|---|
| ID | RSS |
| A | $f_A(RSS)$ |
| B | $f_B(RSS)$ |
| C | $f_C(RSS)$ |
| D | $f_D(RSS)$ |

The methodology described here benefits from the fact that e.g., the switching of the beam causes completely new conditions for the receivable signal strength. This is true for fragmented environments e.g. inside of buildings, based on a multitude of attenuation and reflection effects.

Therefore, a possible implementation is presented here, where the function consists of the beam switching pattern over time. For simplification using only the beam's ID and the sequence. According to an embodiment, characteristics of each beam signal may be communicated and stored. These characteristics may include antenna type, its gain or complete directional radio patterns, the used transmission power (or its progress over the burst's time period), etc.

A possible sequence is shown in FIG. 1 at time frame 0. As shown, a UE is surrounded by several base stations (or gNBs) employing beamforming. The current beam used by each gNB is depicted at time frame 0 for a certain location of the UE. The fingerprint data, which include the IDs and the RSS values of each radio base station is also depicted in the right bottom of FIG. 1. Different angles are also depicted. Time frame 1 is left out for simplification. FIG. 2 shows a further step in the sequence of measurements resulting in a fingerprint data for a certain location at time frame 2.

Combining the measurements of all time frames in a sequence produces a full-featured pattern reference data. FIG. 3 shows the outcome of this combination which includes the fingerprint data at different time frames. The reference position ($UE_{ref}$) may be a Cartesian metric or geodesic coordinate, but it may also be a textual or numeric identifier as annotation for later reconsideration.

At a certain location the measurements were taken for every time frame in a periodic series of temporarily active sender's setups. A sender here denotes a radio base station. In the example from FIG. 1 and FIG. 2, n=12 time frames in each period are used. Any suitable value of n may be used. Hence n=12 is just an example.

It should be mentioned that radio base stations not changing their behavior dynamically or having simple antennas (like dipole) integrate easily. They have relatively stable RSS values in each measurement at every time frame, and the pattern (known or guessed/estimated) may be viewed as a static pattern.

The procedure for the location determination may be denoted matching. This phase generally compares the actual measurement with the reference data taken earlier. In common fingerprinting systems the list of detectable radio base stations with their corresponding RSS will be measured. The matching algorithms try to determine and select reference data from the database with differences as little as possible. The stored locations (aka Pos) of the best matching entries from the database will be combined geometrically. This calculation gives the estimation for the position of the mobile device.

According to an exemplary embodiment, the matching algorithm for the function-based approach is enhanced. There are several major options to compare the actual data with the reference data from the database.

The matching identifies the actual time frame or active configuration of the sender(s) in a period effective on the actual measurement. A period may be defined by absolute clock, or signaled data or through observation. Then, the relevant subsection from the pattern reference data is selected. Subsequently, a classical matching between the measurement data of a time frame and the selected part of the pattern reference data are used to calculate/determine the position of the UE. As an example, only one time frame or subset may be used for the matching; close to the basic fingerprinting approach, only a snapshot may be used, but the expectation (stored in the reference database) is more precise and better comparable.

According to an exemplary embodiment, the received RSS measurements for all time frames of a period in the mobile may be gathered. This is followed by a matching of the gathered data with the corresponding reference data subset for each time frame individually. Subsequently, a combination of all deviations may be performed to select the pattern reference point with the best overall fit to the actual measurement data. The stored position data of the best fitting pattern reference data is then used to calculate or estimate the location of the UE. Instead of RSS, other channel measurements may be used as will be explained.

In highly dynamic environments adaptive base station configurations are important. For the function-based matching technique, the pattern of each base station may be determined. In terms of beam management, round robin techniques are common switching from one beam to another in a sequence. Mobiles (or UEs) having the patterns may be able to adjust their expectations during the matching in the described way. This beam stroking allows to have more complex patterns than round robin. The patterns (mostly sequences) may make use of skipping the next (or more) direct beam neighbors in order to decouple the measurements additionally. A suitable sequence may be comprised of an odd number of beams and a skip of one or more neighboring beams. This produces a continuous sequence of measurements maximizing the decoupling, based on a timing spread.

Figure 4:
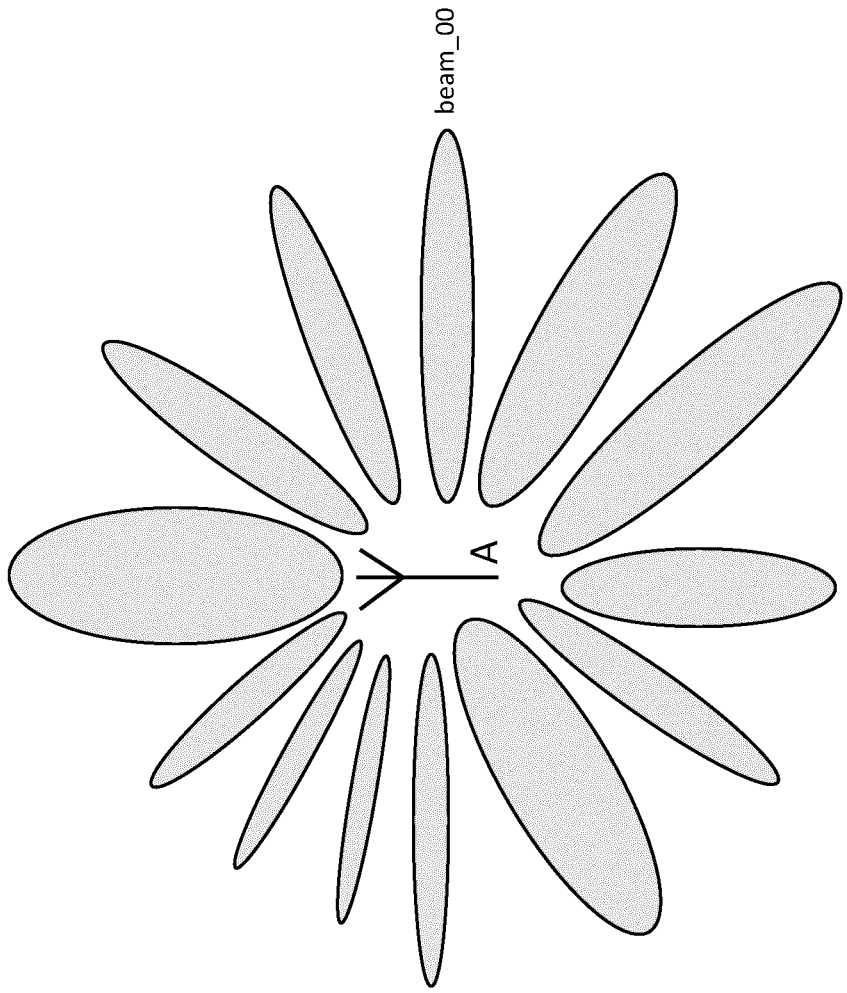
FIG. 4 shows an asymmetrical beam pattern, inhomogeneous beam directions and non-uniform beam characteristics.
Figure 5:
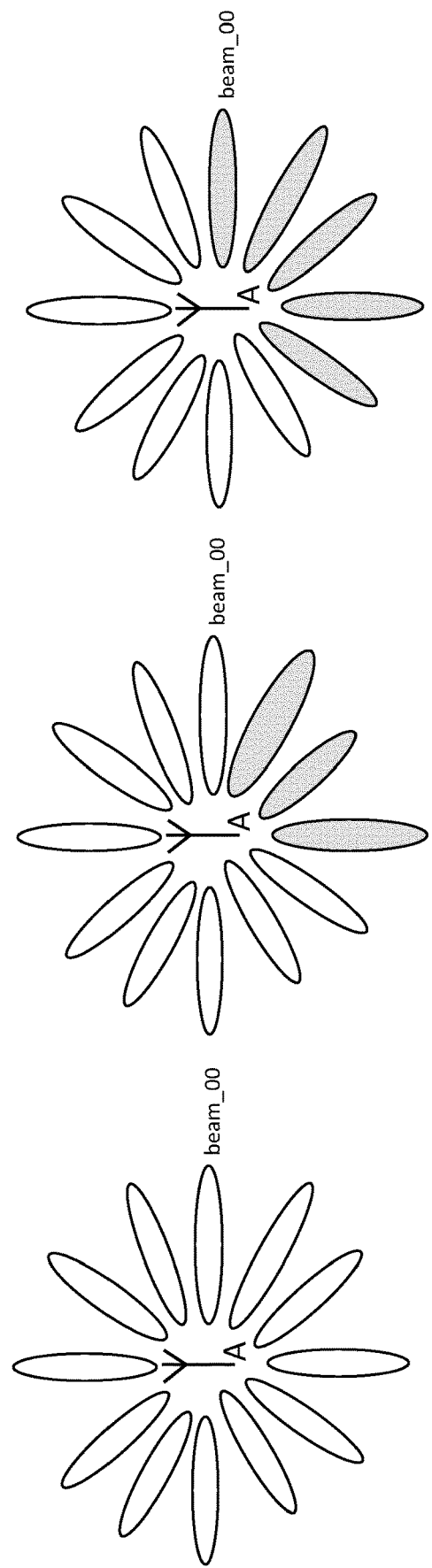
FIG. 5 depicts a dynamic (adaptive) beam configuration (beam forming related) and reconfiguration over time.
Figure 6:
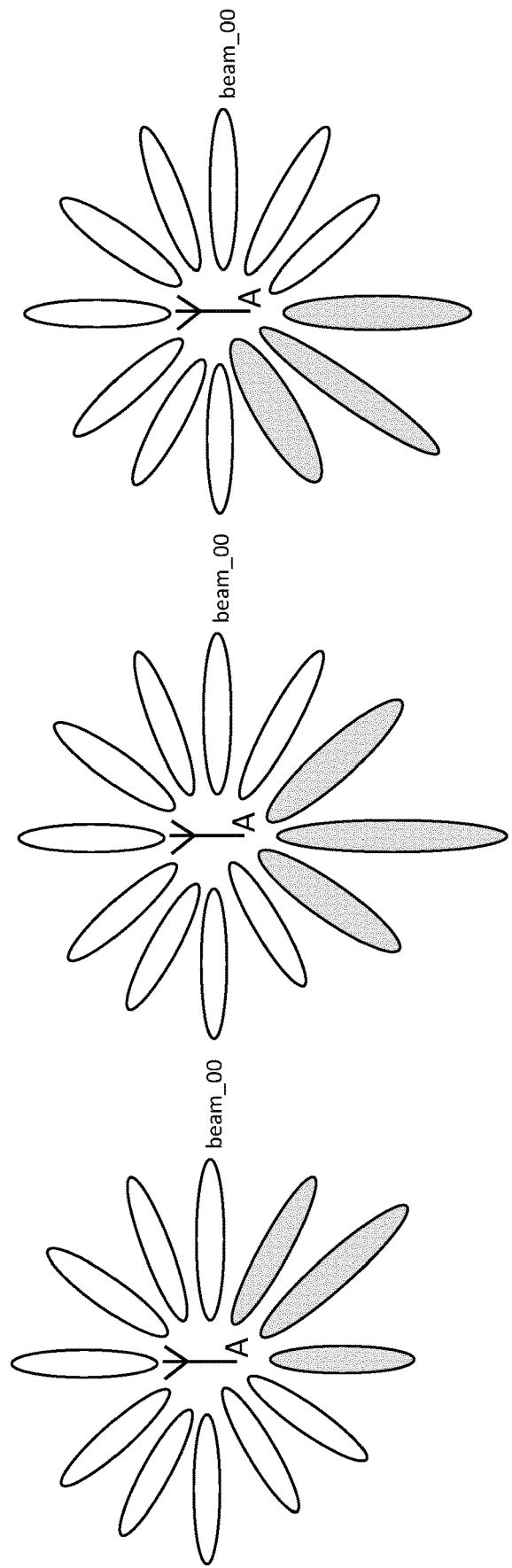
FIG. 6 illustrates a dynamic (adaptive) beam configuration (direction related) and reconfiguration over time.

Beyond the timed sequence, multiple versions of beam manipulations in terms of antenna characteristics are possible. These individual geometric setups may also evolve over time. FIGS. 4-6 illustrate beam patterns and configurations using power ramping. This concept of power ramping (i.e. forming beams over time) requests the definition and signaling of the actual configuration from the station (or management system) to a location calculation/measurement unit/device(e. g. a mobile device or a UE).

FIG. 4 shows an asymmetrical beam pattern, inhomogeneous beam directions and non-uniform beam characteristics. FIG. 5 and FIG. 6 depict dynamic (adaptive) beam configuration (beam forming related) and reconfiguration over time.

According to an embodiment, a measurement device is configured to receive, via higher layer signalling, information on resources or resource sets of one or more transmission devices. A transmission device may be a radio base station or a gNB or a TRP (transmission and reception point). The transmission devices transmit one or more beam signals associated with the resources or resource sets. The information on the resources, may be received from a location server or an LMF (Location and Management Function) over an LPP (LTE positioning protocol) message. Example of a resource or resource set is a DL PRS resource (downlink positioning reference signal). The location server or the LMF of the location server may determine that resources or resource sets from a gNB are transmitted with different beam characteristics or has different spatial filters. A spatial filter may be viewed as antenna characteristics used by a device to receive/measure a set of beams. The spatial filter may also be viewed as antenna characteristics used by a device to transmit a set of beams.

The LMF may request gNB(s) to provide information on spatial direction (e.g. beams). In this case the LMF may send the request in a NRPPa assistance data request message. NRPPa stands for new radio positioning protocol A and is a protocol within the 5G RAN (Radio Access Network) 3GPP standard.

The measurement device may receive, via higher layer signalling, the information on the resources or resources from one or more gNBs. As an example, the information may be received using an RRC (Radio Resource Control) message. An SSB (synchronization signal block) resource information or CSI-RS (channel state information-reference signal) resource information, or SRS (sounding reference signal) resource information may be provided to the measurement device from the transmission devices. In the case of SRS, the measurement device may be a gNB or radio base station or a TRP, and the transmission device may be a UE.

The transmission devices transmit one or more beams signals associated with the resources or resource sets and the measurement device performs channel measurements of the one or more beam signals, per spatial filter of the measurement device. A spatial filter may be viewed as a receiver (Rx) beam used by the measurement device to receive and measure the beam signals. Definition of the spatial filter was previously presented. The channel measurements may be one or more of the following: RSSI (receive signal strength indicator), RSS (receive signal strength), RSRP (receive signal receive power), SNR (signal to noise ratio), RSRQ (receive signal receive quality, timing RSTD (receive signal time difference), RTOA (relative time of arrival), TA (timing advance), etc.

According to an embodiment, the measurement device stores, over at least one time frame, the channel measurements into measurement groups, where each measurement group corresponds to the channel measurements performed using the same spatial filter of the measurement device. The measurement device then reports the measurement groups to a network node (e.g. the LMF or the location server). The measurement device may correlate the measurements of each measurement group with reference data for each available time frame, individually, and reports the result of the correlation to the network node (e.g., location server or LMF).

In an example, the measurement device may store the received channel measurements measured during one or more time frames into different measurement groups and may report in a single measurement report the channel measurements, the measurement group and the time frame of each measurement.

Figure 7A:
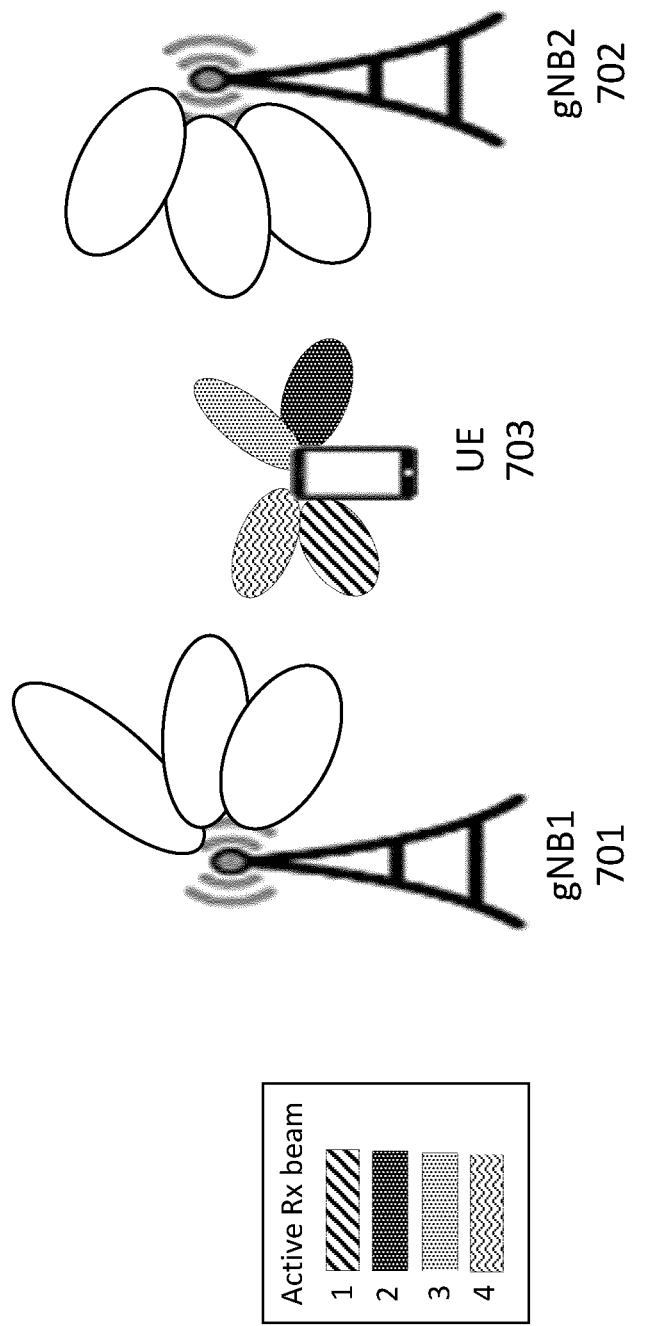
FIG. 7A illustrates a scenario involving a measurement device (UE) with multiple spatial filters (or receiver beams) measuring multiple beams from neighboring radio base stations.
Figure 7B:
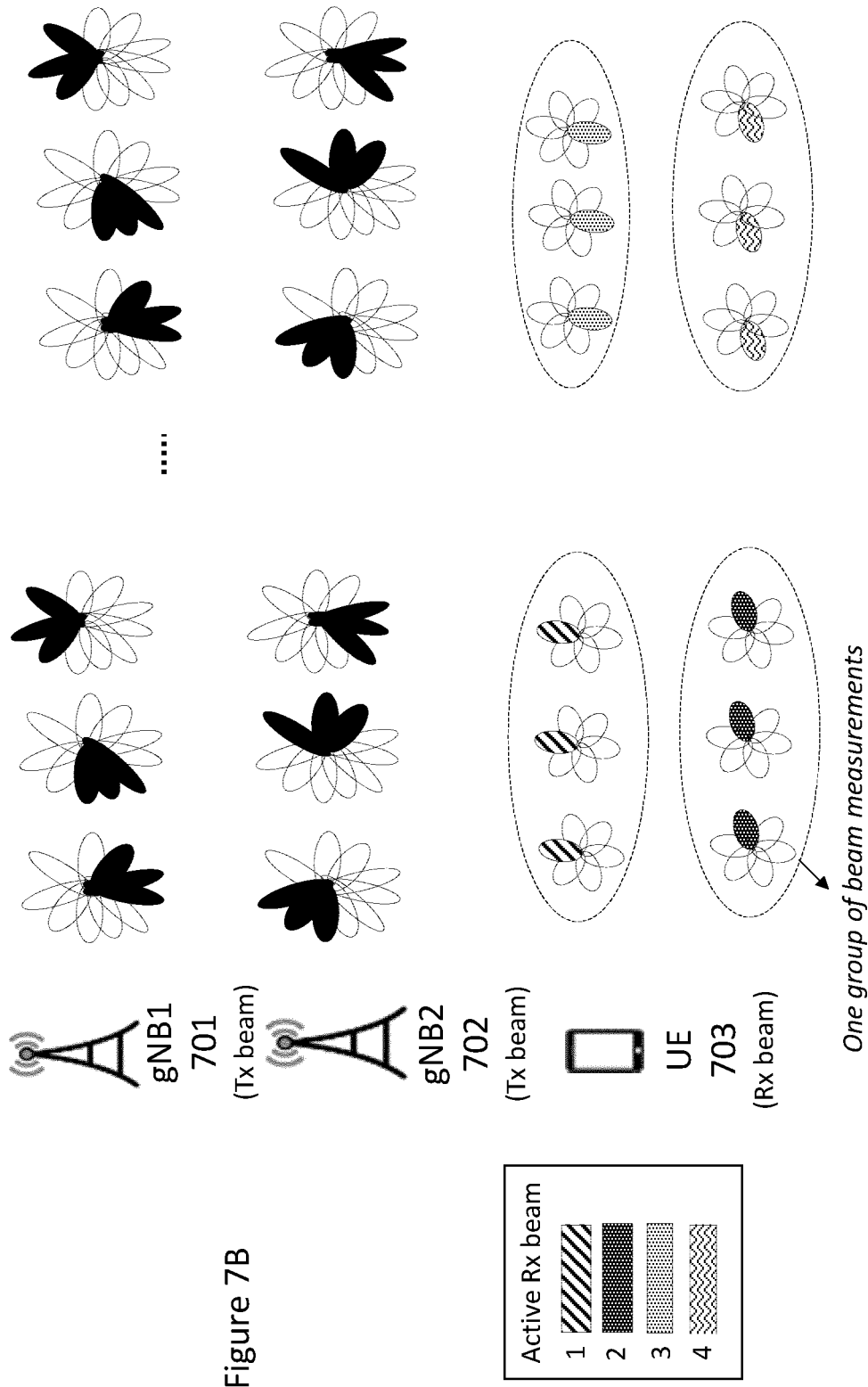
FIG. 7B illustrates a scenario wherein the measurement device measures Tx beams from two radio base stations and groups the measurements into groups according to an embodiment.

Referring to FIG. 7A, there is illustrated a network scenario involving two gNBs (gNB1 701, gNB2 702) and one measurement device, UE 703. The UE 703 is shown employing four receiver beams (or spatial filters), used to measure beam signals (Tx beams) transmitted by the two gNBs 701, 703. FIG. 7B illustrates an example where each gNB transmits beams (at different time frames), and the UE employs the spatial filter(s) or (active) Rx beam (s), to perform measurements of the transmitted beams. A group of beam measurements is also illustrated. The UE 703 groups the measurements into measurement groups. In this example, the UE 703 may activate two beams at the same time and measure a total of four beams. The UE may include multiple spatial filters or receiver beams as shown in the figures.

According to an embodiment, if the measurement device employs more than one spatial filter (as shown in FIGS. 7A-7B), the measurement device may map the same resources or resource set in different measurement groups. The resources or resource sets corresponds to the beams transmitted from one or more base stations for the same time frame. A network node (or location server) may request over higher layer signaling the measurement device capability on multiple spatial filter reception. It should be noted that the network node may be a serving gNB requesting over RRC the UE capabilities. The network node may be an LMF requesting over LPP the UE physical transmission and reception capabilities. The network node may be an LMF requesting over NRPPa the UE physical transmission and reception capabilities from a gNB. The network node may be an LMF requesting over NRPPa the gNB physical transmission and reception capabilities. The measurement device is configured to report a signal of the same resource or resource set received by N spatial filters in M reported measurement groups, where N is larger than or equal to M. N and M may take any suitable value.

According to an embodiment, the measurement device is configured to determine a correlation between the measurement groups, and report the result of the correlation that is below a defined threshold value, to the network node or location server (not shown). As an example, if the result of the correlation is high (i.e., exceeds a defined threshold value), the measurement values of the groups may be considered redundant and hence ignored or not reported. If the result of the correlation is low (i.e. below the defined correlation threshold value), the information can be useful, and the group measurements are reported to the location server. The correlation value(s) or the result of the correlation may be a reference value itself and reported as an additional fingerprinting information.

The table below illustrates an example of normalized correlation values between the measurement groups performed by the measurement device for different PRS resources 1-6. The measurement device (UE) is here assumed to employ four spatial filters (or Rx beams 1-4) for the measurements of beam signals associated with the PRS resources 1-6. In this example, the UE spatial filter (UE Rx Beam 1) is configured to be the reference that results in the maximum correlation value of 1. The correlation of the measurements taken by the other UE spatial filters (UE RX Beam 2, 3 and 4) with the reference beam are also indicated in the table. The PRS resources can correspond to one or multiple gNBs.

| Spatial filter | Resource per gNB | | | | | |
|---|---|---|---|---|---|---|
| | PRS resource 1 | PRS resource 2 | PRS resource 3 | PRS resource 4 | PRS resource 5 | PRS resource 6 |
| UE Rx Beam 1 | 1 | 1 | 1 | 1 | 1 | 1 |
| UE Rx Beam 2 | 0.35 | 0.41 | 0.32 | 0.21 | 0.11 | 0.44 |
| UE Rx Beam 3 | 0.71 | 0.84 | 0.62 | 0.46 | 0.43 | 0.32 |
| UE Rx Beam 4 | 0.8 | 0.91 | 0.95 | 0.76 | 0.74 | 0.73 |

The first row in the table above corresponds to the (normalized) correlation values determined based on channel measurements performed on 6 Tx beam signals transmitted by one or more gNBs, each beam signal conveys a PRS resource. The measurement device uses the same spatial filter (Rx beam 1). Hence, the first row corresponds to the first group determined based on measurements performed using spatial filter 1 (or Rx beam 1), the second row corresponds to the second group based on measurements performed using spatial filter 2 (or Rx Beam 2), etc. The measurements may be performed at the same time frame or at different time frames depending on the capabilities of the measurement device. For the example above, since the measurement device has four spatial filters, the device can perform measurements at the same time. The measurements and/or the correlation values may be stored in the measurement device, over at least one time frame.

The measurement device may determine the correlation between the groups, depending on the configuration provided by the location server or LMF. The location server may configure the measurement device, for power reduction, not to report groups exceeding a defined correlation threshold value. As an example, correlation values below a threshold value of 0.6 are reported to the location server for determining a position of the measurement device. Correlation values above 0.6 are not reported since these values do not contribute to the positioning calculation at the location server. It is appreciated that the correlation threshold value is a design parameter.

According to an embodiment, the measurement device may be configured to combine deviations between the channel measurements and the reference data (pattern) and select a pattern reference point which matches the measurement performed at a given time frame, e.g., the actual measurement data. In one example, the deviation is parameterized from a probability density distribution obtained from the channel measurements and the reference data. For a normal distribution, the deviation is parametrized by mean and variance of the set of the channel measurements and a set of pattern reference points.

Figure 8:
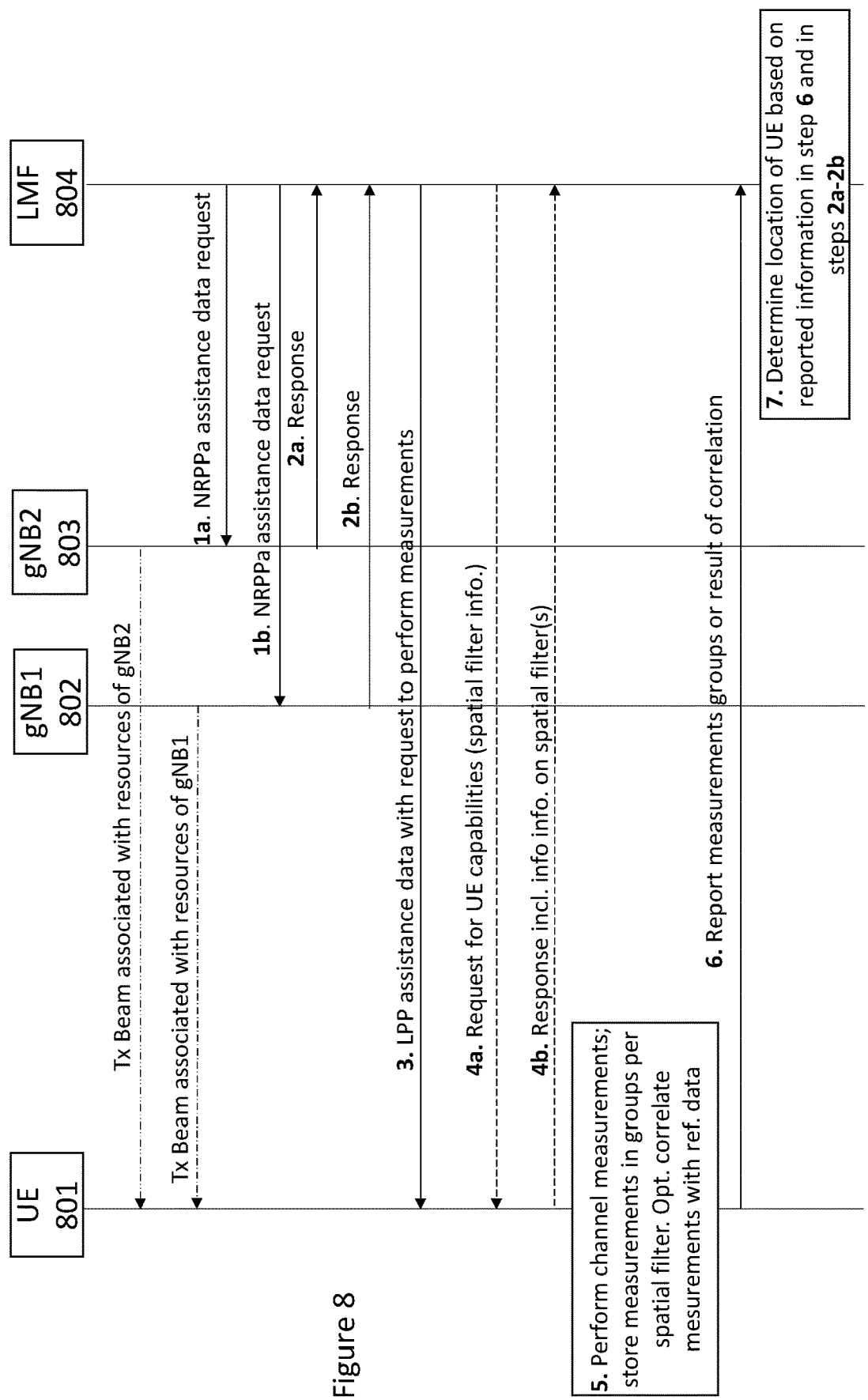
FIG. 8 illustrates a signalling diagram involving a UE, two gNBs and a LMF, according to some embodiments.

Referring to FIG. 8, there is illustrated an example of a signalling diagram involving some of the previously described embodiments. The diagram involves a UE 801 (measurement device); a first and a second radio base station gNB1 802, gNB2 803, and a network node in the form of a LMF 804 (or location server). As shown:

1a-1b. The LMF 803 requests the gNBs 802-803 to provide information on resources or resource sets associated with one or more beam signals transmitted by the gNBs 802-803. The requests may be sent in a NRPPa assistance Data request message. Hence, the LMF 804 may determine that resources or resource sets from the gNBs 802, 803 are transmitted with (different) beam characteristics that may have different spatial filters.

2a-2b. Each gNB 802-803 provides the requested information to the LMF 804 in a NRPPa response message.

3. The LMF 804 sends, via higher layer signalling, to the UE 801, assistance data or information on resources or resource sets. This information is sent in an LPP assistance data message. This message is a request to the UE 801 to perform channel measurements of the one or more beam signals, per spatial filter of the UE 801. The LMF 804 may indicate to the UE 801 a correlation index to use for the measurement reporting. For example, the LMF 804 may indicate in the message, a correlation threshold value to be used by the UE 801 for determining the type of information to report to the LMF 804.

As described earlier, the assistance data may be sent by each gNB to the UE 801.

4a. The LMF 804 may request the UE 801 to provide it capabilities with regards to the number or type of spatial filters or Rx beams the UE 801 employs for the channel measurements.

4b. The UE 801 provides the information if requested by the LMF 804 in step 4a.

5. The UE 801 performs channel measurements of the one or more Tx beam signals, per spatial filter of the UE 801. The channel measurements may include one or more of the following: RSSI, RSS, RSRQ, RSRP, SINR, absolute/relative RSTD, RTOA, TA etc.

The UE 801 stores, over at least one time frame, the channel measurements into measurement groups, where each measurement group corresponds to the channel measurements performed using the same (active) spatial filter of the UE 801. The UE 801 may also correlate the measurements of each measurement group with reference data for each available time frame individually. For example, the LMF 804 may request the UE to perform the correlation.

6. The UE 801 reports the measurement groups, or the result of the correlation to the LMF 804. This report may be sent in an LPP location information message.

7. The LMF 804 uses the reported measurement groups received from the UE 801 and the information received from gNB1 802 and gNB2 803, received in steps 2a-2b for determining the location of the UE 801. The LMF 804 may also use the reference data for determining the location of the UE 801.

Figure 9:
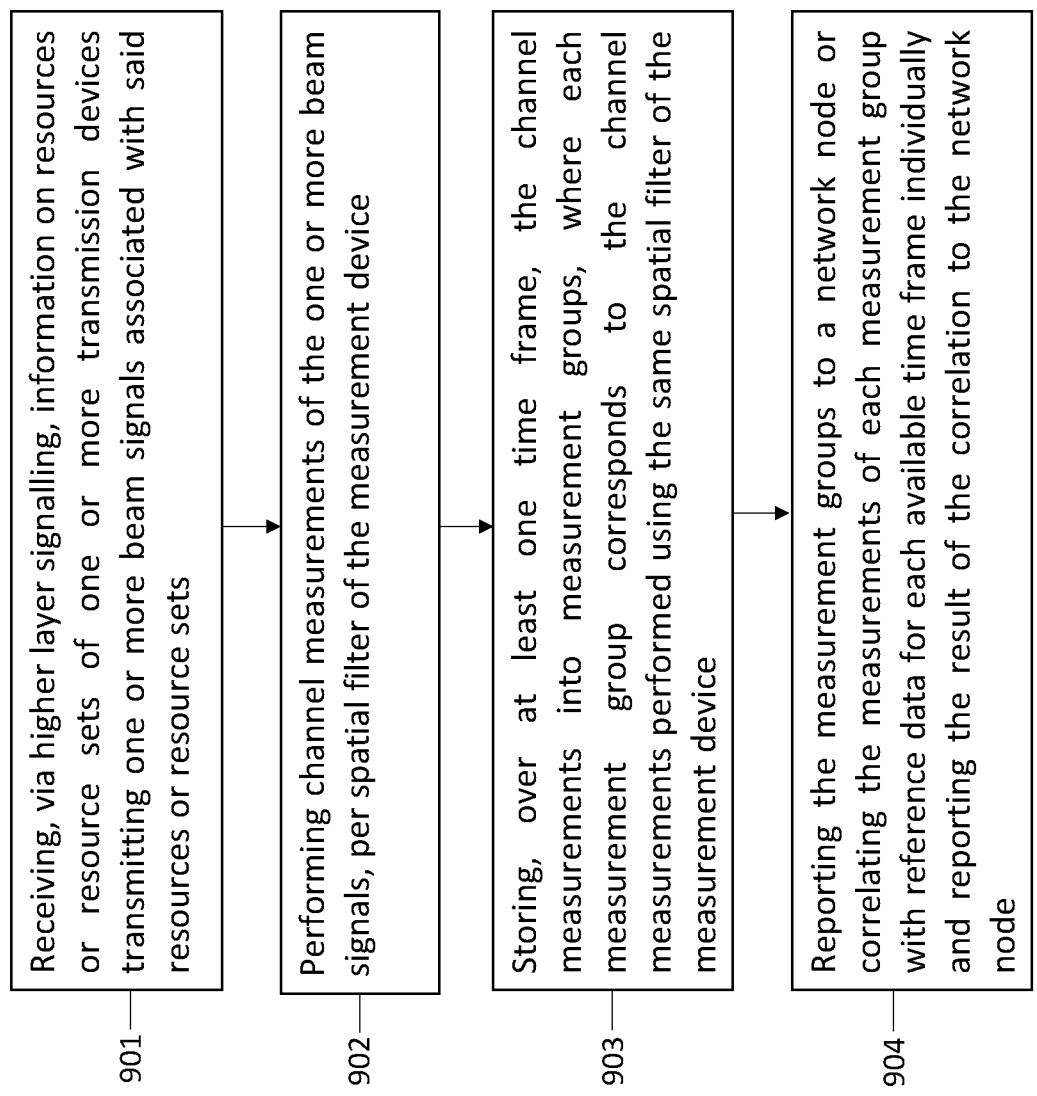
FIG. 9 illustrates a flowchart of a method performed by a measurement device according to some exemplary embodiments.

Referring to FIG. 9, there is depicted a flowchart of a method performed by a measurement device in accordance with previously described embodiments. The method comprises:

(901) Receiving, via higher layer signalling, information on resources or resource sets of one or more transmission devices transmitting one or more beam signals associated with said resources or resource sets;

(902) Performing channel measurements of the one or more beam signals, per spatial filter of the measurement device (903) Storing, over at least one time frame, the channel measurements into measurement groups, where each measurement group corresponds to the channel measurements performed using the same spatial filter of the measurement device. The measurement device may store characteristics of sectored and beam formed antennas as at least one pattern or at least one function for each surrounding radio base station and further store corresponding measured signal strengths over at least one time frame; and (904) reporting the measurement groups to a network node (LMF or location server) or correlating/matching the measurements of each measurement group with reference data for each available time frame individually and reporting the result of the correlation to the network node.

Additional actions performed by the measurement device have already been described.

Figure 10:
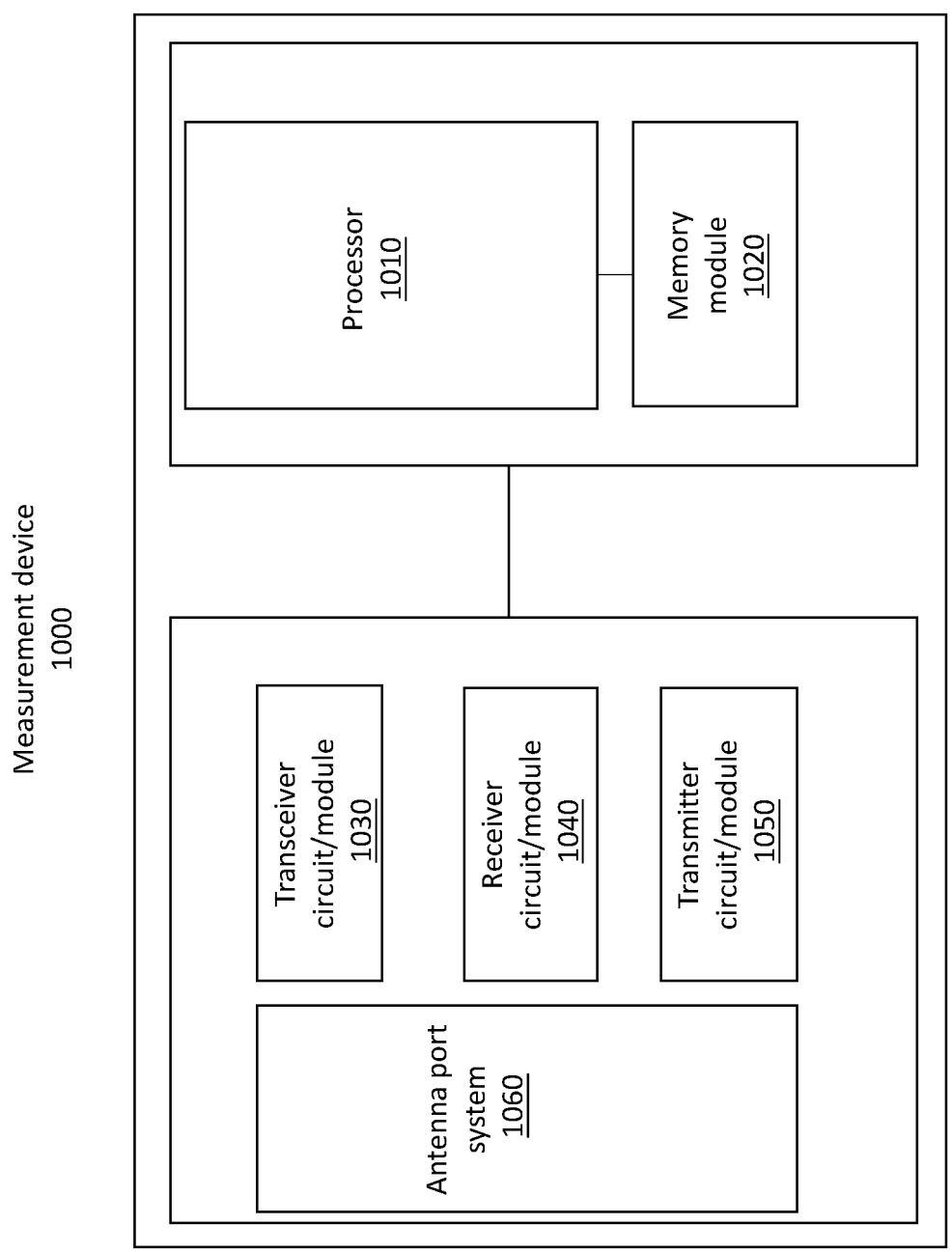
FIG. 10 illustrates a block diagram of a measurement device according to an embodiment.

In order to perform the method described above, there is provided a measurement device. FIG. 10 illustrates a block diagram depicting a measurement device 1000. The measurement device 1000 may be a UE or a radio base station. The device 1000 comprises a processor 1010 or processing circuit or a processing module or a processor or means; a receiver circuit or receiver module 1040; a transmitter circuit or transmitter module 1050; a memory module 1020 a transceiver circuit or transceiver module 1030 which may include the transmitter circuit 1050 and the receiver circuit 1040. The measurement device 1000 further comprises an antenna system 1060 which includes antenna circuitry for transmitting and receiving signals to/from at least the gNB or other UEs. The antenna system employ beamforming as previously described. The actions performed by the device have already been described. The memory 1020 contains instructions executable by the processor 1010 whereby the measurement device 1000 is operative/configured to perform the subject matter disclosed herein.

The processing module/circuit 1010 includes a processor, microprocessor, an application specific integrated circuit (ASIC), field programmable gate array (FPGA), or the like, and may be referred to as the "processor." The processor 1010 controls the operation of the measurement device and its components. Memory (circuit or module) 1020 includes a random access memory (RAM), a read only memory (ROM), and/or another type of memory to store data and instructions that may be used by processor 1010. In general, it will be understood that the device 1000 in one or more embodiments includes fixed or programmed circuitry that is configured to carry out the operations in any of the embodiments disclosed herein.

In at least one such example, the processor 1010 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the measurement device 1000 may comprise additional components. The measurement device 1000 may belong to any radio access technology including 4G or LTE, LTE-A, 5G, advanced 5G or a combination thereof that support beamforming technology.

There is also provided a computer program comprising instructions which when executed on at least one processor of the measurement device 1000 according to claim 12, cause at least said one processor to carry out the methods disclosed herein.

There is also provided a carrier containing the computer program, wherein the carrier is one of a computer readable storage medium; an electronic signal, optical signal or a radio signal.

Figure 11:
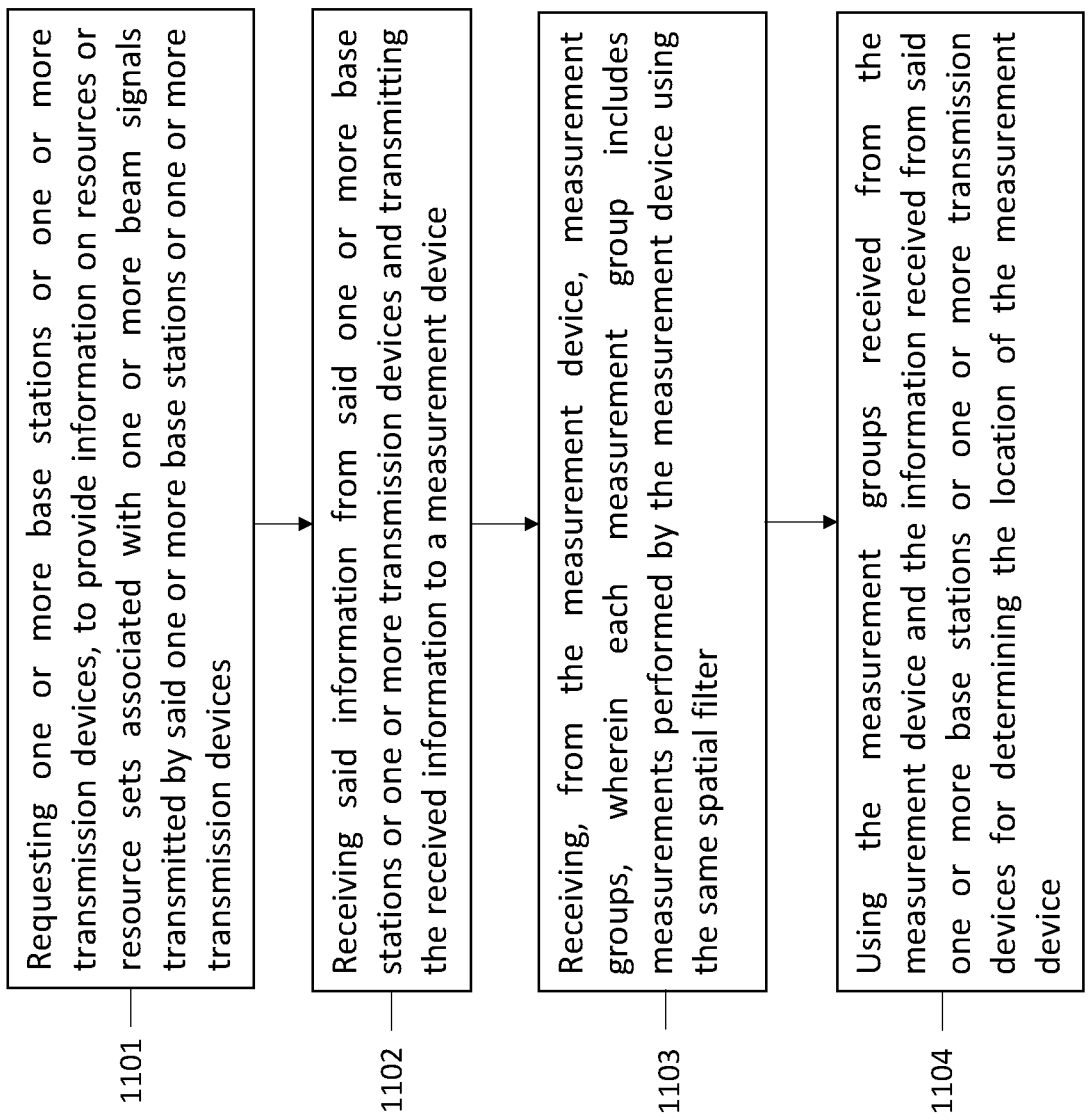
FIG. 11 illustrates a flowchart of a method performed by a location server according to some exemplary embodiments.

Referring to FIG. 11, there is depicted a flowchart of a method performed by a network node or a location server or a LMF (in a location server), in accordance with previously described embodiments. The method comprises:

(1101) Requesting one or more base stations or transmission devices, to provide information on one or more beam signals and/or information on resources or resource sets associated with said one or more beam signals transmitted by said on or more base stations (or gNBs);

(1102) Receiving said information from said one or more base stations or transmission devices and transmitting the received information to a measurement device;

(1103) Receiving, from the measurement device, measurement groups, wherein each measurement group includes measurements performed by the measurement device using the same spatial filter; and (1104) Using the measurement groups received from the measurement device and the information received from said one or more base stations or transmission devices for determining the location of the measurement device.

Additional actions performed by the location server have already been described.

Figure 12:
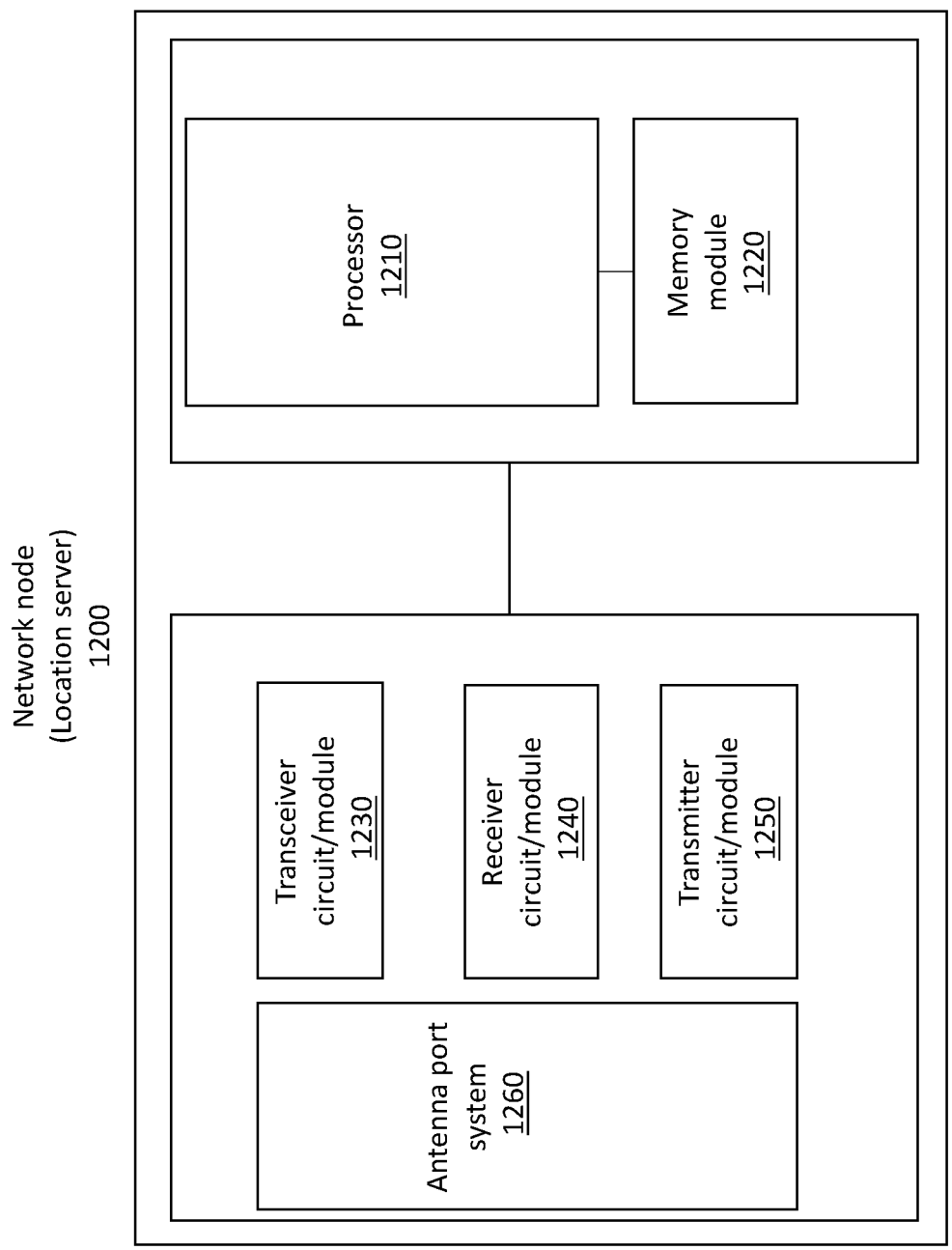
FIG. 12 illustrates a block diagram of a network node (location server) according to an embodiment.

In order to perform the method steps above, there is provided a network node (e.g., a location server or a LMF within a server). FIG. 12 illustrates a block diagram depicting a network node 1200. The network node 1200 comprises a processor 1210 or processing circuit or a processing module or a processor or means; a receiver circuit or receiver module 1240; a transmitter circuit or transmitter module 1250; a memory module 1220 a transceiver circuit or transceiver module 1230 which may include the transmitter circuit 1250 and the receiver circuit 1240. The network node 1200 further comprises an antenna system 1260 which includes antenna circuitry for transmitting and receiving signals to/from at least the gNB or other UEs. The antenna system employ beamforming as previously described. The actions performed by the network node have already been described. The memory contains instructions executable by the processor 1210 whereby the network node 1200 is operative/configured to perform the subject matter disclosed herein.

The processing module/circuit 1210 includes a processor, microprocessor, an application specific integrated circuit (ASIC), field programmable gate array (FPGA), or the like, and may be referred to as the "processor." The processor 1210 controls the operation of the network node and its components. Memory (circuit or module) 1220 includes a random access memory (RAM), a read only memory (ROM), and/or another type of memory to store data and instructions that may be used by processor 1210. In general, it will be understood that the network node 1200 in one or more embodiments includes fixed or programmed circuitry that is configured to carry out the operations in any of the embodiments disclosed herein.

In at least one such example, the processor 1210 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node 1200 may comprise additional components. The device 1000 may belong to any radio access technology including 4G or LTE, LTE-A, 5G, advanced 5G or a combination thereof that support beamforming technology.

There is also provided a computer program comprising instructions which when executed on at least one processor of the network node according to claim 16, cause at least said one processor to carry out the method according to the subject matter disclosed herein.

There is also provided a carrier containing the computer program, wherein the carrier is one of a computer readable storage medium; an electronic signal, optical signal or a radio signal.

Several advantages are achieved by the embodiments herein compared to the classic fingerprinting approach.

The 5G standards especially New Radio (NR) have several mechanisms included providing functions for the concept which may make take advantage of the teaching of the presented embodiments. An example is the beam management with the sending of SSB CSI-RS, PRS, SRS or other suitable signals suitable as beam stroking pattern.

Having more specialized functions available can lead to a more robust positioning determination method. The specialization can even be scenario-dependent; e.g. indoors one can expect a different variance in the signals compared to outdoor areas.

A globally known behavior of the function is a suitable solution. But more convenient should be dynamic hence adaptive configuration of a function. Information about this behavior should be transferred not only between backend nodes but also to the mobile nodes or UEs. Hence, signaling between network nodes and UEs is helpful.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, Bluetooth, satellite communications, TV broadcasting etc. that may employ Fingerprinting for locating a device or a node or an equipment in a network.

The invention claimed is:

1. A method performed by a measurement device with more than one receiver beam, the method comprising:
   receiving via higher layer signaling, information on resources or resource sets of one or more transmission devices transmitting one or more beam signals associated with said resources or resource sets;
   performing channel measurements of the one or more beam signals, per receiver beam of the measurement device;
   storing over at least one time frame, the channel measurements into measurement groups, where each measurement group corresponds to the channel measurements performed using the same receiver beam of the measurement device, wherein the receiver beam used for the channel measurements for a measurement group, is different from a receiver beam used for the channel measurements for another measurement group;
   correlating the measurements of each measurement group with reference data for each available time frame individually; and
   reporting the measurement groups to a network node for enabling the network node to use the measurement groups, to determine the location of the measurement device.

2. The method according to claim 1, further comprising determining a correlation between the measurement groups, and reporting, to the network node, the result of the correlation that is below a defined correlation threshold value.

3. The method according to claim 1, wherein if the measurement device employs more than one receiver beam, further comprising mapping the same resources or resource sets in different measurement groups.

4. The method according to claim 1, further comprising combining deviations between the channel measurements and the reference data and selecting a pattern reference point which matches the measurement performed at a given time frame.

5. The method according to claim 1, further comprising receiving from the network node, in a long term evolution positioning protocol (LPP) message, the information on resources or resource sets, wherein the network node is a location server.

6. The method according to claim 1, further comprising receiving from at least one network node, in a Radio Resource Control (RRC) message, the information on resources or resource sets, wherein the network node is a radio base station.

7. The method according to claim 1, wherein the channel measurements include at least one of a receive signal strength indicator (RSSI), a receive signal receive power (RSRP), a receive signal receive quality (RSRQ), a signal-to-noise ratio (SNR), a receive signal time difference (RSTD), a relative time of arrival (RTOA), or a timing advance (TA).

8. A method performed by a location server, the method comprising:
   requesting one or more radio base stations or transmission devices, to provide information on one or more beam signals and/or information on resources or resource sets associated with said one or more beam signals transmitted by said one or more base stations or transmission devices;
   receiving said information from said one or more base stations or transmission devices and transmitting the received information to a measurement device;
   receiving, from the measurement device, measurement groups, wherein each measurement group includes measurements performed by the measurement device using the same receiver beam, wherein the receiver beam used for the channel measurements for a measurement group is different from a receiver beam used for the channel measurements for another measurement group, and wherein the measurements of each measurement group are correlated with reference data for each available time frame individually; and
   using the measurement groups received from the measurement device and the information received from said one or more base stations or transmission devices for determining the location of the measurement device.

9. The method according to claim 8, further comprising requesting the measurement device to provide capabilities of the measurement device with regards to the number of receiver beams.

10. The method according to claim 8, further comprising transmitting in a long term evolution positioning protocol LPP message, the information on resources or resource sets.

11. The method according to claim 8, wherein the channel measurements include at least one of a receive signal strength indicator (RSSI), a receive signal receive power (RSRP), a receive signal receive quality (RSRQ), a signal-to-noise ratio (SNR), a receive signal time difference (RSTD), a relative time of arrival (RTOA), or a timing advance (TA).

12. A measurement device comprising a processor and a memory, said memory containing instructions executable by said processor whereby said measurement device is configured to:
- receive, via higher layer signaling, information on resources or resource sets of one or more transmission devices transmitting one or more beam signals associated with said resources or resource sets;
- perform channel measurements of the one or more beam signals, per receiver beam of the measurement device;
- store, over at least one time frame, the channel measurements into measurement groups, where each measurement group corresponds to the channel measurements performed using the same receiver beam of the measurement device, wherein the receiver beam used for the channel measurements for a measurement group, is different from a receiver beam used for the channel measurements for another measurement group;
- correlate the measurements of each measurement group with reference data for each available time frame individually; and
- report the measurement groups to a network node, for enabling the network node to use the measurement groups, to determine the location of the measurement device.

13. The measurement device according to claim 12, further configured to determine a correlation between the measurement groups, and report the result of the correlation that is below a defined threshold to the location server.

14. The measurement according to claim 12, wherein if the measurement device employs more than one receiver beam, the measurement device is further configured to map the same resources or resource sets in different measurement groups.

15. The measurement device according to claim 12, further configured to combine deviations between the measurements and the reference data and select a pattern reference point which matches the measurement performed at a given time frame.

16. A location server comprising a processor and a memory, said memory containing instructions executable by said processor whereby said location server is configured to:
- request one or more radio base stations or transmission devices, to provide information on resources or resource sets associated with one or more beam signals transmitted by said on or more base stations;
- receive said information from said one or more radio base stations or transmission devices and transmit the received information to a measurement device;
- receive, from the measurement device, measurement groups, wherein each measurement group includes measurements performed by the measurement device using the same receiver beam, wherein the receiver beam used for the channel measurements for a measurement group is different from a receiver beam used for the channel measurements for another measurement group, and wherein the measurements of each measurement group are correlated with reference data for each available time frame individually; and
- use the measurement groups received from the measurement device, and the information received from said one or more radio base stations or transmission devices for determining the location of the measurement device.

* * * * *